(12) United States Patent
Holan et al.

(10) Patent No.: US 8,365,201 B2
(45) Date of Patent: Jan. 29, 2013

(54) MULTI-FUNCTION DEVICE ID WITH UNIQUE IDENTIFIER

(75) Inventors: Doron J. Holan, Seattle, WA (US); Randall E. Aull, Kenmore, WA (US); Narayanan Ganapathy, Redmond, WA (US); James G. Cavalaris, Kirkland, WA (US); Esaias E. Greeff, Redmond, WA (US); Douglas K. Brubacher, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1078 days.

(21) Appl. No.: 12/002,060

(22) Filed: Dec. 14, 2007

(65) Prior Publication Data

US 2009/0158301 A1 Jun. 18, 2009

(51) Int. Cl.
*G06F 3/00* (2006.01)
*G06F 3/048* (2006.01)

(52) U.S. Cl. ......................................... 719/321; 715/763

(58) Field of Classification Search .................... None
See application file for complete search history.

(56) References Cited

U.S. PATENT DOCUMENTS

| | | |
|---|---|---|
| 6,216,196 B1 | 4/2001 | Elwell et al. |
| 6,266,701 B1 | 7/2001 | Sridhar |
| 6,282,586 B1 | 8/2001 | Bullough |
| 6,421,069 B1 | 7/2002 | Ludtke et al. |
| 6,886,049 B2 | 4/2005 | Wong |
| 7,013,350 B2 | 3/2006 | Enns |
| 7,124,226 B2 | 10/2006 | Khanna |
| 7,277,719 B2 | 10/2007 | Klassen |
| 7,283,546 B2 | 10/2007 | Gallant |
| 2003/0093768 A1* | 5/2003 | Suzuki .......................... 717/100 |
| 2003/0140191 A1* | 7/2003 | McGowen et al. ........... 710/302 |
| 2005/0149639 A1 | 7/2005 | Vrielink et al. |
| 2005/0187924 A1 | 8/2005 | Brubacher et al. |
| 2005/0203673 A1 | 9/2005 | El-Hajj |
| 2005/0246455 A1 | 11/2005 | Bhesania et al. |
| 2006/0080517 A1 | 4/2006 | Brown |
| 2006/0238789 A1 | 10/2006 | Pesar |
| 2007/0027879 A1 | 2/2007 | Bridges et al. |
| 2007/0027895 A1* | 2/2007 | Bridges et al. ................ 707/102 |
| 2007/0097437 A1* | 5/2007 | Okada .......................... 358/1.18 |
| 2008/0059981 A1* | 3/2008 | Belanger-Basset et al. .. 719/322 |

OTHER PUBLICATIONS

Guidelines for Bus and Device Specifications, http://www.download.microsoft.com/download/1/6/1/161ba512-40e2-4cc9-843a-923143f3456c/SpecGuide_v1a.doc) (2000) pp. 1-29.

Zhao, "Enabling Global Service Attributes in the Service Location Protocol," http://www3.ietf.org/proceedings/04mar/I-d/draft-zhao-slp-attr-03.txt (2004) pp. 1-7.

(Continued)

*Primary Examiner* — S. Sough
*Assistant Examiner* — Carina Yun

(57) ABSTRACT

A computer system that recognizes multi-function devices and associates functions with multi-function devices. Each multi-function device may be represented by a multi-function object, allowing tools, applications or other components within the computer to take actions relating to the entire device or relating to a function based on the association of that function with other functions in the same device. These actions include displaying information about devices, instead of or in addition to information about functions. Actions also include selecting functions based on proximity within a device. Functions may be associated with a multi-function device using a unique device identifier provided by the device or generated for the function based on a connection hierarchy between functions and the computer. Devices may be configured to provide the same identifier regardless of the transport over which the device is accessed.

20 Claims, 12 Drawing Sheets

OTHER PUBLICATIONS

Barnes, S. et al., Transport Discovery in Wireless Multi-Transport Environments, IEEE, 2003, p. 1328-1333, http://ieeexplore.ieee.org/xpl/freeabs_all.jsp?arnumber=1200566.

Duan, Q., et al., Axiomatic Multi-Transport Bargaining: a Quantitative Method for Dynamic Transport Selection in Heterogeneous Multi-Transport Wireless Environments, IEEE, 2006, p. 98-105, http://ieeexplore.ieee.org/Xplore/login.jsp?url=/ie15/11060/34934/01683448.pdf?tp=&isnumber=&arnumber=1683448.

Extended Systems Releases New Infrared Software Development Kit for Handheld Devices, Feb. 12, 2001, http://findarticles.com/p/articles/mi_m0EIN/is_2001_Feb_12/ai_70356275.

Knutson, C. et al., Dynamic Autonomous Transport Selection in Heterogeneous Wireless Environments, IEEE, 2004, p. 689-694, http://ieeexplore.ieee.org/xpl/freeabs_all.jsp?tp=&arnumber=1311269&isnumber=29115.

Krueger, M. et al., NAA Naming Format for iSCSI Node Names, Feb. 2003, http://www.ietf.org/proceedings/03mar/I-D/draft-ietf-ips-iscsi-name-ext-00.txt.

Multitransport Device Installation and PnP X Out-of-Band Association, Microsoft Corp., Nov. 14, 2007, download.microsoft.com/download/9/c/5/9c5b2167-8017-4bae-9fde-d599bac8184a/PnPX-OOBassoc.docx.

Wang, L., A Performance Evaluation of Dynamic Transport Switching for Multi-Transport Devices, Dec. 2006, http://contentdm.lib.byu.edu/cgi-bin/showfile.exe ?CISOROOT=/ETD&CISOPTR=844& filename=etd1603.pdf.

Designing Multifunction Devices for Windows Operating Systems, http://www.microsoft.com/whdc/device/mf/mfdesign.mspx pp. 1-4; downloaded Oct. 7, 2007.

"Enabling User Customization," http://www.download-uk.oracle.com/docs/cd/B10464_05/wireless.904/b10948/advcust.htm pp. 1-16; downloaded Oct. 7, 2007.

* cited by examiner

MULTI-FUNCTION DEVICE ID WITH UNIQUE IDENTIFIER

BACKGROUND

To provide versatility, computers may connect to one or more devices. Examples of devices include printers, scanners, faxes, cameras, microphones and personal digital assistants (PDA's). Such devices may be connected to the computer over one or more transports, such as a Universal Serial Bus (USB) or a Bluetooth link.

From the perspective of the computer, each of these devices performs a "function." Each function may be connected to the computer using a transport. A transport may be a wired bus, such as a USB or a wireless transport, such as a Bluetooth link.

The computer may discover each function through a driver associated with a specific transport that in turn interfaces to the function through a device driver. The device driver may contain instructions to configure the function, obtain status information about the function or control operation of the function. These capabilities to interact with the device through the device driver may be exposed to a user of the computer through one or more user interfaces, such as a "control panel" or programmatic interfaces.

Some devices, called multi-function devices, perform multiple functions. For example, a device may provide a printer, scanner and fax functions in a single physical package. Each such function is associated with a driver. When multi-function devices are connected to a computer system, the system recognizes the individual functions and applications that can use the functions.

SUMMARY OF INVENTION

An experience for a user of a computer system may be improved by enabling the computer to recognize that a multi-function device is attached to the computer and to identify the functions associated with the device. With this capability, for example, a computer may present to a user information about the multi-function device rather than information about individual functions. Information about the device may more closely match the perception of the user, who may see a single device attached to the computer, even though that device performs multiple functions.

In addition, in scenarios where related functions are best suited to perform coordinated action, identifying functions provided by a multi-function device may facilitate better selection of related functions. For example, a computer may be connected to multiple devices that provide the same function, such as multiple microphones. It may be desirable to use a microphone built into the same device as a camera to record audio associated with a scene being captured with the camera. Doing so requires selection of the appropriate microphone, which is possible if functions associated with a multi-function device may be identified.

In one aspect of the invention, multi-function devices may be identified by instructing each function to provide a unique identifier for its device. The device may provide the same unique identifier for every function it implements regardless of the transport over which the device is accessed.

In another aspect of the invention, for functions implemented in devices that are not configured to provide a unique device identifier, a unique device identifier may be generated for a function. In one embodiment, the device identifier may be generated for a function by inheriting an identifier from a parent node, such as a bus hub or other component that acts as a parent node for the function in a connection hierarchy.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have appreciated that a user experience may be improved by representing an actual physical multi-function device as a single entity and grouping functions performed by the device. The inventors have further appreciated that functions performed by a multi-function device may be associated with each other using a device identifier that is the same for multiple functions in a device.

Currently, different technologies provide different identifiers (e.g., Media Access Control (MAC) address, serial number, etc.), which may preclude using the identifiers for multi-function devices, particularly, for multi-function devices connected to a computer or other system over multiple communication media.

Embodiments of the invention provide an identifier for a multi-function device which may be referred to as a "device unique ID" (DUID). The device identifier may be obtained using several methods. Employing the identifier allows identifying functions performed by a multi-function device to be identified as part of a single device.

Information about which devices are multi-function devices and which functions are performed by the same device may be used in multiple ways, including selecting functions or displaying information about functions. For example, identifying that functions of a multi-function device belong to the same device may allow managing the functions as part of the device. Updating software for one of the functions of a multi-function device may result in notifying other functions of the device of the update. Furthermore, the multi-function device as a whole may be more manageable when the functions of the device are maintained as part of the device. The information may also be used to present a more intuitive and therefore more useful interface.

Figure 1:
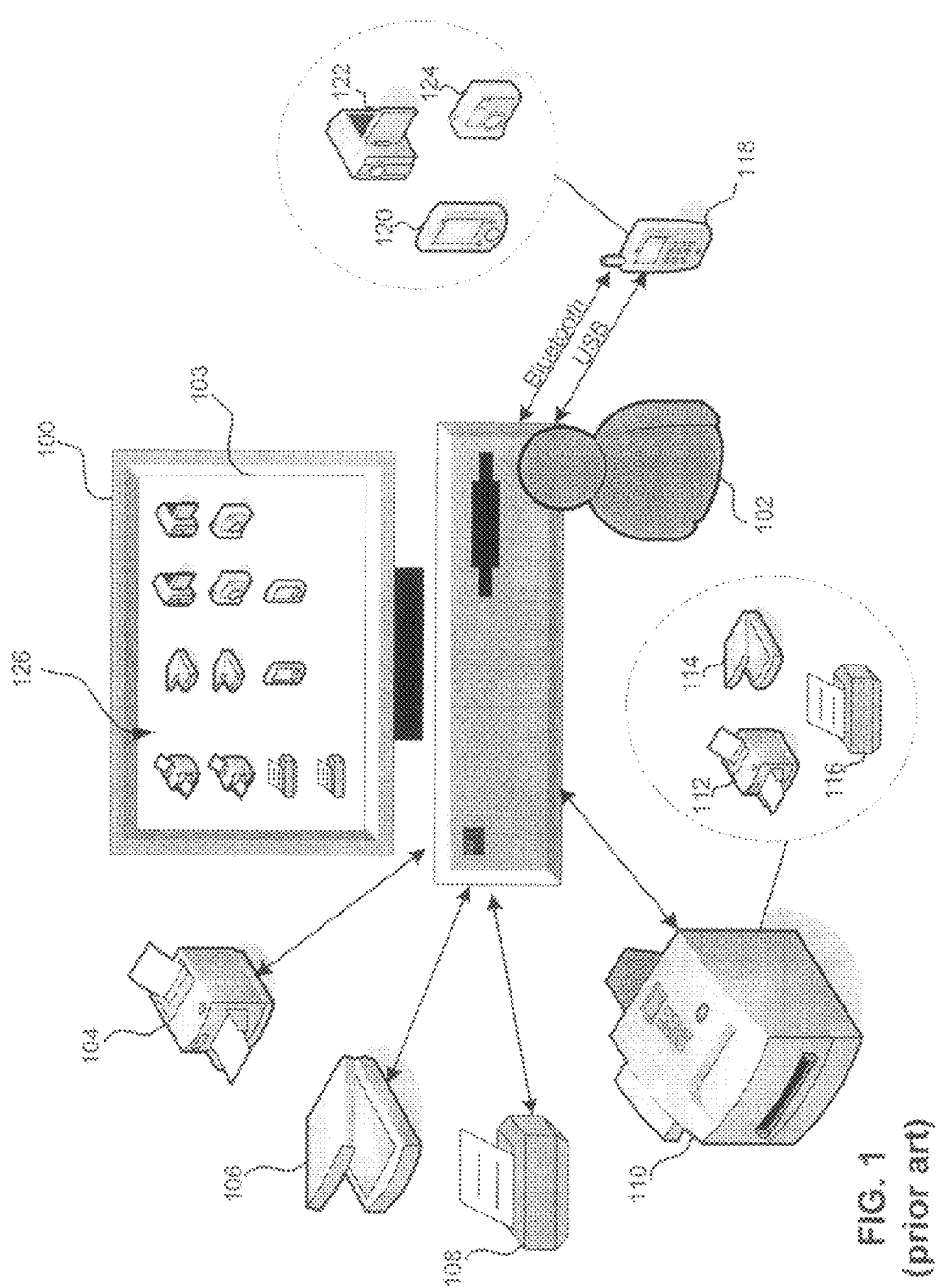
FIG. 1 is a sketch of an example of a prior-art system comprising multi-function devices.

FIG. 1 shows an example of a prior art system in which multi-function devices are represented to a user of the system. In this example, a user 102 uses a computer system 100 to view and manage different single- and multi-function devices. The devices are a fax 104, a scanner 106, a printer 108, and a multi-function device 110 that performs functions of a fax 112, a scanner 114, and a printer 116. In addition, user 102 may utilize a multi-function (e.g., "smart") phone 118 that performs functions of a phone 120, a video camera 112 and a digital photo camera 124. Phone 118 is shown by way of example as connected to computer system 100 via both a USB and a Bluetooth link. It should be appreciated that the devices may be connected to computer 100 via different wired and wireless communication media. It should also be appreciated that any number of suitable devices may be connected to or accessible by computer 100 in any suitable way.

Computer 100 may include a device manager or other user interface through which a user may select or control the devices. Devices 104, 106 and 108, may be presented to user 102 on a display 103 of computer 100 as icons 126. Likewise, functions 112, 114, 116, 120, 122 and 124 may be presented. The display may comprise, for example, a graphical user interface. It should be appreciated that the function of the devices are shown as the icons resembling the devices for representation purposes only and, in embodiments of the invention, any suitable formats may be used to display information relating to the devices or functions. Further, each icons may be manipulated (e.g., clicked on, moved, deleted, etc.) and information associated with the icon may be presented on display 103.

As shown in FIG. 1, display 103 includes icons 126 for each function associated with computer 100 regardless of whether that function is implemented in an actual physical device that performs a single function (e.g., devices 104, 106, and 108) or a multi-function device (e.g., devices 110 and 118). For example, icons 126 comprise two respective identical icons for two printers, faxes and scanners, one set of icons representing functions provided by fax 104, scanner 106 and printer 108 and one set representing functions performed by multi-function device 110. Further, two icons are shown for each of phone 120, video camera 112 and digital photo camera 124 functions of phone 118 accessible by computer system 100 via the USB connection and the Bluetooth link.

Therefore, user 102 may not be able to distinguish which icons represent physical devices each performing a single function and which icons represent functions of a multi-function device, which impairs ability of the user to manage multi-function device. Moreover, it affects the user experience as a whole because it is not apparent from the representation on a display of the devices that functions of a multi-function device are associated with the device. As an example, in the system shown in FIG. 1, an "out of paper" message may be sent to computer 100 from multi-function device 110. While both scanner 114 and printer 116 functions are affected by this event, the user may receive (e.g., via display 103) the respective warning as related to either both functions or to only one of the functions. Thus, the user may not be able to identify that multi-function device 110 as a whole is out of paper, as opposed to one of the functions performed by the device.

It should be appreciated that identifying individual functions behind a device as separate functions may present other limitations. In some devices, for example, firmware can only be updated for the devices as a whole.

Embodiments of the invention provide a method that helps overcome limitations associated with inability to identify that a device is a multi-function device performing a plurality of functions or that separate functions are performed by the same device. Accordingly, in some embodiments, a device identifier may be obtained for the device and each function performed by the device may be identified by the same identifier.

Figure 2:
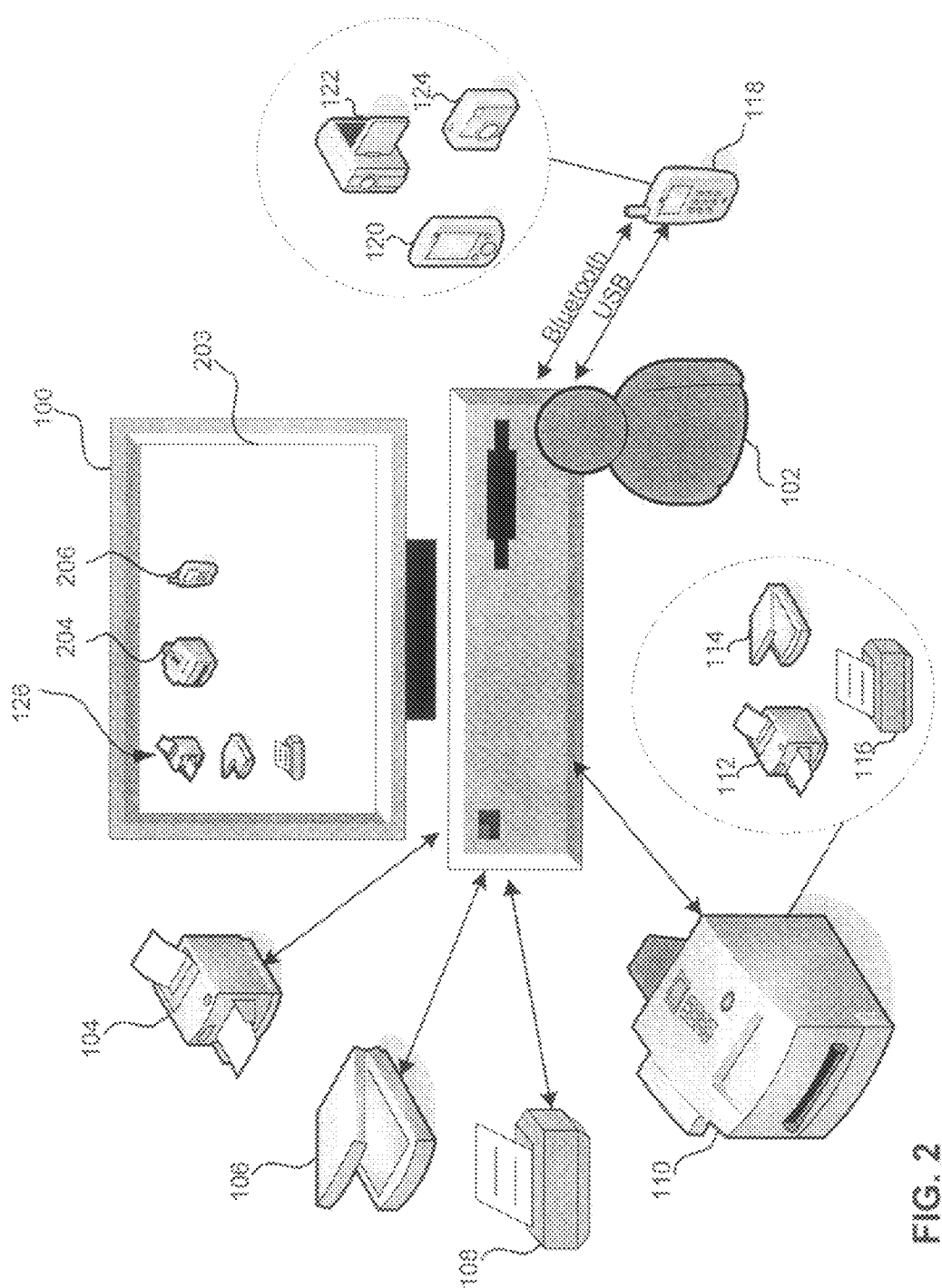
FIG. 2 is a sketch of an example of a system in which multi-function devices are presented to a user of the system according to some embodiments of the invention.

FIG. 2 shows an example of a system in which multi-function devices are presented to a user of the system. This system is essentially identical to the system shown in FIG. 1 and includes similar components. However, a display 203 contains icons 126 for single-function devices 104, 106 and 108 and icons 204 and 206 representing multi-function devices. Thus, an icon 204 represents multi-function device 110 which combines functionality of a fax, printer and scanner, and an icon 206 represents multi-function device 118 that performs function of a cell phone, video camera and a digital photo camera. The user experience thus may be improved by enabling the user to view multi-function devices as single entities on a display. In FIG. 2, icons 204 and 206 bear a resemblance to the respective physical devices 110 and 118. However, it should be appreciated that any suitable representation that facilitates user experience may be substituted.

The icons representing multi-function devices (e.g., icons 204 and 206) may be selected and information associated with the multi-function devices may be presented in any suitable way. For example, upon clicking on an icon corresponding to a multi-function device, functions performed by the multi-function device may be shown, either as icons corresponding to the functions (e.g., as shown in FIG. 1) or in other suitable visual formats. In addition, other visual and textual information may be presented for the multi-function device and its functions.

Identifying function of a multi-function device may overcome limitations of the system described in connection with FIG. 1. For example, installing, uninstalling, updating, rolling back and repairing software and performing other function on the multi-function device may be possible. Thus, if it is desired, for a multi-function device incorporating a printer, scanner and fax functions, to install software monitoring an ink supply in the device, the software associated with the device as a whole may be installed. In the example above shown in FIG. 1 describing the "out of paper" message, some embodiments of the invention may enable the user to identify that the multi-function device as a whole is out of paper. Furthermore, a multi-function device can be disabled from a computer communicating with the device because the computer has the information of all of the functions of the devices. This capability may be used in any suitable way. For example, to update software for the device, the device does not need to be turned off.

To enable identification of a device performing different functions as a multi-function device, embodiments of the invention provide a method of identifying that a function belongs to the multi-function device. To implement the method, a device unique identifier (e.g., a DUID) may be utilized to identify functions of the device. Each function performed by a multi-function device may be identified by the same identifier. Functions performed by different devices may be identified using different identifiers, i.e., each multi-function device may be associated with an identifier that is unique. In some scenarios, the DUID may be obtained from the device. In scenarios in which a device is not constructed to provide a DUID, one may be generated for each function. The DUIDs may be generated in a way that identifies functions in the same device by the same DUID.

Figure 3:
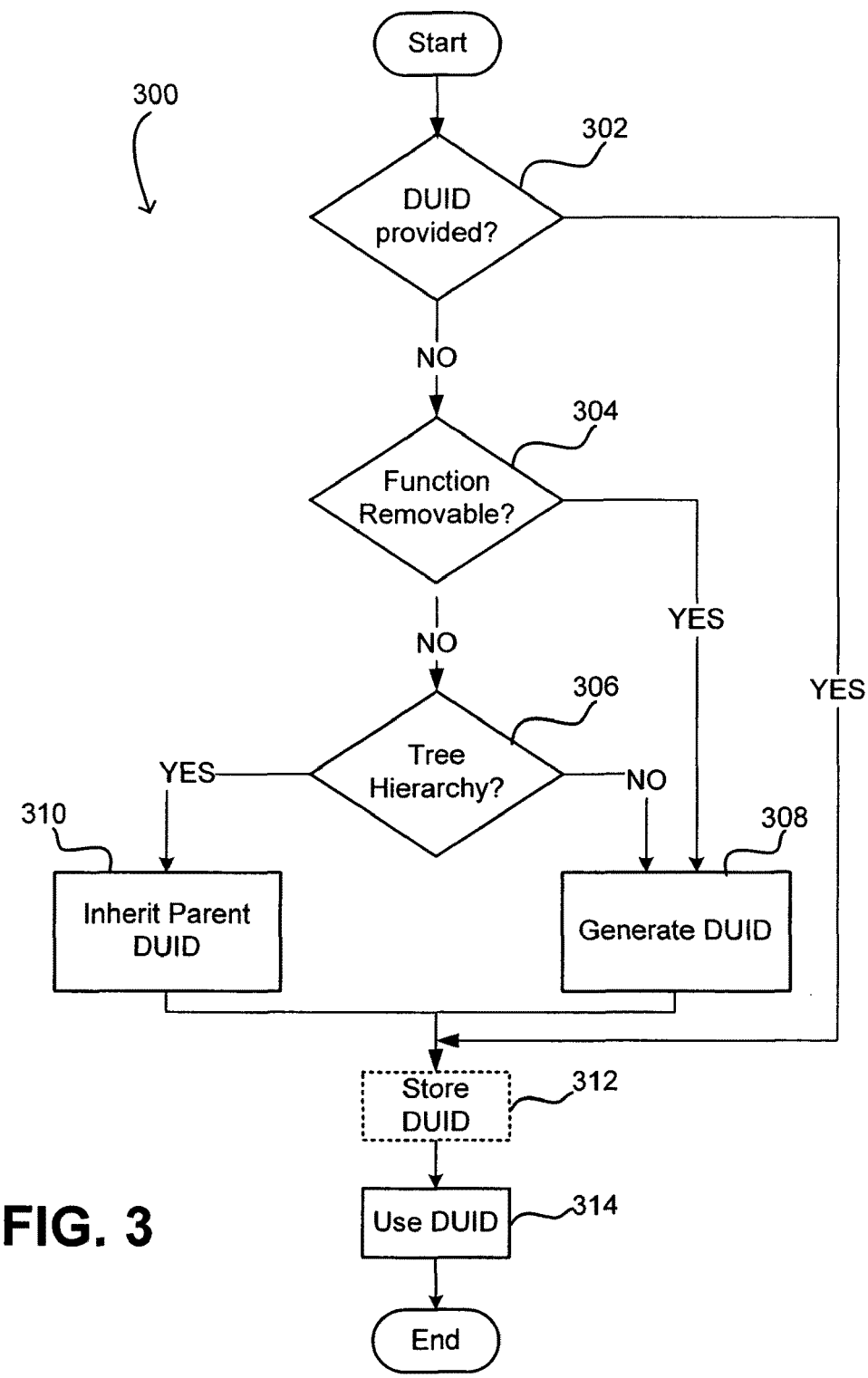
FIG. 3 is a flowchart of a method of generating an identifier for a multi-function device according to some embodiments of the invention.

FIG. 3 illustrates a method of obtaining an identifier for a multi-function device in accordance with some embodiments of the invention. The process may start when a multi-function device connects to or is associated with a computing device (e.g., computer 100) or at any other suitable time. In a block 302, it is determined whether the identifier can be obtained from the device. For example, the identifier may be provided by a manufacturer of the device and stored in a non-volatile memory of the device. The DUID may be provided by a driver associated with the device, such as a bus driver or a device driver associated with functions of the device. In some embodiments, the DUID may be provided by some other entity that can discover and enumerate devices and/or functions connected to or accessible in any suitable way by computer 100. In some embodiments, the DUID may be generated by the driver and associated with a Media Access Control (MAC) address, a serial number of the device and with other suitable parameters. It should be appreciated that the driver generating the DUID may be any suitable component.

This capability may support smooth upgrade and migration of a device state from one computer device to another and the same identifier for the device may be obtained on any computer and upon each activation of the device. It may therefore be desirable to encourage manufacturers of multi-function devices to provide identifiers along with the device (e.g., stored in a non-volatile memory of the device). The identifier may then be retrieved by a bus driver, as described in more detail below. It should be appreciated that the identifier may be obtained for the multi-function device by requesting the identifier from one or more functions performed by the device. The same identifier may be obtained from each function performed by the device. If the identifier is available, the process may branch to block 312 where the identifier may optionally be stored.

If the identifier for the device is not available, the process may continue to a decision block 304. Block 304 may be the start of a sub-process of generating a DUID. In some embodiments, the identifier may be generated by the bus driver, though the sub-process may be implemented in any suitable components. At decision block 304, it is determined, for one or more functions performed by the device, whether the function is user removable, i.e., whether the function can be physically removed by the user from the device. This determination may be made in any suitable way. For example, a removable bit in a code provided by the function may be used to determine whether the function is removable. Other suitable methods can be substituted.

If it is determined that the function is removable, the process may continue to block 308 where the identifier is generated as, for example, a random number. It should be appreciated that the identifier may be generated using any suitable method that provides generating a different identifier for each device. For example, the DUID may be generated using some suitable information on the device.

If it is determined in decision block 304 that the function is not removable, which may mean that the function is part of an actual physical device, it may be determined in a decision block 306 whether the function has a parent device that has an identifier. Information about devices in a system may be located in a device tree which may be maintained and updated as devices are added or removed based on how the devices are connected to the computer. Each node in the device tree may be referred to as a devnode. The structure of the device tree may be hierarchical, wherein devices communicating over a bus may be represented as "children" of a bus device (e.g., a bus adapter, controller, etc). Multi-function devices may or may not have a root devnode, i.e., a device that is a parent of all devices that belongs to a multi-function object. For example, printer, scanner and fax functions of a multi-function device may be "children" of USB Common Class Generic Parent (CCGP) driver, which supports USB devices with multiple USB functions. If the function has a parent device, the function may inherit an identifier for the parent device, in a block 310. It should be noted that in this context the term "function" is used to denote a function which is part of a multi-function device. It should be appreciated that a devnode in a device tree may correspond to either a single function of a physical device that performs the function or to a function of a multi-function device.

If a topology of devices in a system does not have a parent-child relationship (e.g., a Bluetooth connection), the process may branch to a block 308 where the identifier may be generated. A known technique to generate a unique value may be used in block 308. However, any suitable mechanism may be used. In this case, devices in multiple trees may be combined into the same multi-function object.

The generated identifier or the identifier obtained from a parent may be optionally stored, as shown in a block 312 of FIG. 3. The identifier obtained using any of the described methods may then be used to realize functionality provided by embodiments of the invention.

It should be appreciated that embodiments of the invention use identifiers for multi-function devices of the same format across different types of devices. It is also desirable that manufacturers of the devices embed identifiers of a uniform format to multi-function devices. However, embodiments of the invention may operate even if the devices do not provide identifiers. As a specific example, a 128-bit identifier may be generated in accordance with the Request for Comments (RFC) 4122 standard. However, embodiments of the invention are not limited in this respect and any suitable format may be used.

Figure 4:
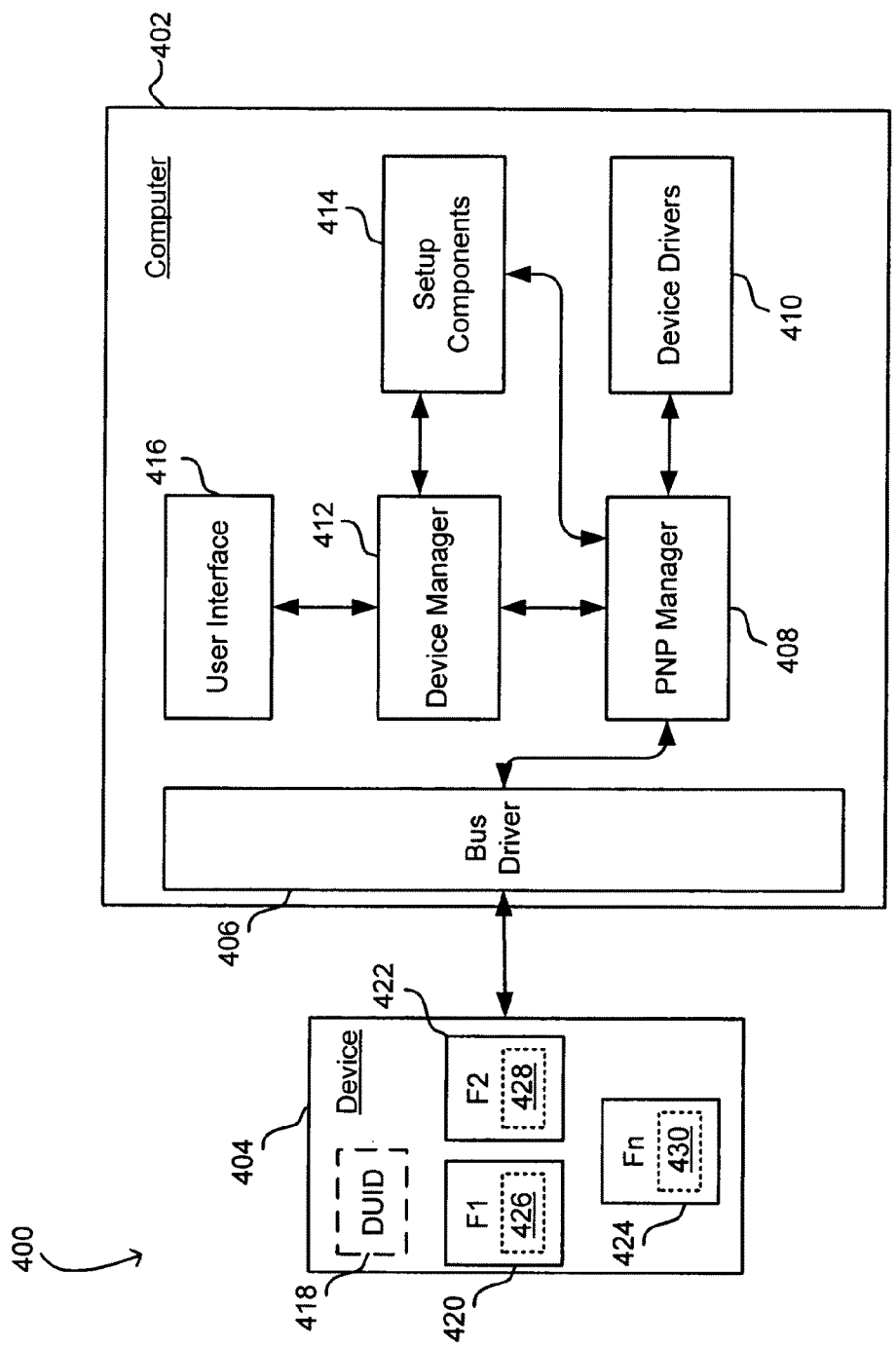
FIG. 4 is a block diagram of a system in which some embodiments of the invention may be implemented.

FIG. 4 shows an example of a system in which embodiments of the invention may be implemented. A system 400 comprises a computer 402 and a multi-function device 404, which may communicate via one or more wireless or wired communication media. Examples of the communication media may be, for example, a USB port, a Bluetooth connection and others. Device 404 includes a DUID 418 which is shown in a dotted line to demonstrate that DUID 418 may or may not be provided by a manufacturer of the device 404. The DUID may be stored in a non-volatile memory, such as a Flash memory or a microcode memory in the device. However, the specific mechanism used to store DUID for 418 is not critical to the invention and any suitable mechanism may be used.

The computer 402 comprises a Plug-and-Play (PNP) manager 408 that maintains the device tree that keeps track of hardware devices in the system. PNP Manager 408 may build or add to the device tree when computer 401 boots, upon plugging a device or associating the device to a computer, or at any other suitable point. PNP manager 408 may use information from device drivers 410 and other components associated with the devices, and may update the tree as devices are added or removed. For example, in some embodiments, PNP manager 408 may communicate with a bus enumerator such as an IPBusEnum which monitors a list of devices currently present on the system. In other embodiments, a bus enumerator such as an UMBus Root Bus Enumerator or UMBus Enumerator may be substituted. It should be appreciated that the invention is not limited in this respect and any one or more suitable components may be substituted.

In the example illustrated in FIG. 4, bus driver 406 may report to PNP manager 408 which devices are present on the bus and may notify the PNP manager 408 that the devices on the bus have changed. PNP manager 408 may request information on a new device, which may include requesting an identifier for the device. The drivers associated with the devnodes (e.g., device drivers 410) can provide identifiers for the devices. If the identifiers are not obtained from device driver 410, PNP manager 408 may automatically generate the identifiers as described above in connection with FIG. 3. PNP manager 408 may then store the identifiers.

Computer 402 comprises setup components 414, which perform multiple device installation tasks. It should be appreciated that setup components 414 are shown as a single component for representation purposes only and more than one components of different types may perform the installation tasks.

A device manager 412 enables a user of computer 402 to view and manage devices on or associated with computer 402. Device manager 412 may provide a user interface 416 on a display of computer 402 for the user to view a graphical and/or textual representation of the devices. For example, icons such as icons 204 and 206 shown in FIG. 2 may be presented to the user for each installed device.

Device 402 is shown in FIG. 4 as comprising three functions 420, 422 and 422, each having a respective identifier 426, 428 and 430. Device 404 includes an identifier (e.g., DUID) 418. Identifiers are shown in a dotted line to indicate that they may not be present on the device and may alternatively be generated using the methods provided by embodiments of the invention. Each of the functions 420, 422 and 422 may have a separate function driver, represented by device drivers 410.

Figure 6:
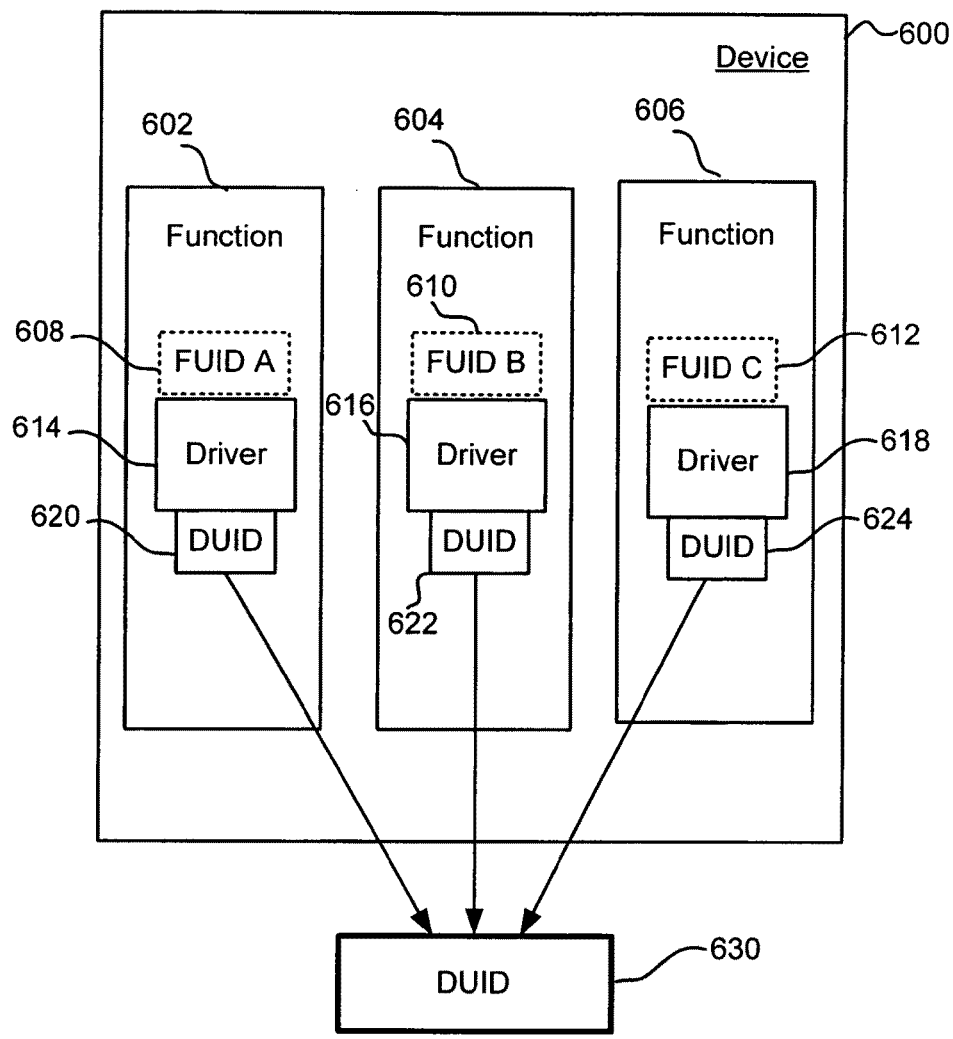
FIG. 6 is a block diagram of a multi-function device according to an embodiment of the invention.

Identifiers for the functions performed by multi-function device 404 may comprise not only an identifier for the whole device, but also function identifiers specific for each function. As shown in FIG. 6, a device 600 performs functions 602, 604 and 606, each having respective drivers 614, 616, and 618, function unique identifiers (FUIDs) 608, 610 and 612, and device identifiers 620, 622 and 624. It should be appreciated that the function and device identifiers are shown by way of example only and components of device 600 which are not shown may include the identifiers (e.g., a memory of the device).

Function identifiers 608, 610 and 612 may be generated when multi-function device 600 is a multi-function, multi-transport device, i.e., when the device is associated with a computer via multiple communication means (which may be referred to as "transports"). It should be appreciated that function identifiers may be obtained using any suitable method. For example, the function identifier may be generated using a device identifier such as a DUID obtained from the device. In some embodiments, a function in a multi-function, multi-transport device has the same function identifier across all of the transports of the device. This allows the PNP manager to build composite device objects to represent functions appearing across multiple transports in the multi-function, multi-transport device, as described in more detail below.

In some embodiments, a multi-function, multi-transport device may have both function and device identifiers available (e.g., provided by a manufacturer of the multi-function, multi-transport device, generated by a driver such as a bus driver and associated with a MAC address, a serial number of the device or with other suitable parameters). In such scenarios, functions across different transports may have the same device identifier.

In other embodiments, the device identifier may not be available for a multi-function, multi-transport device and may need to be generated using methods provided by embodiments of the invention. For example, the PNP manager may generate the device identifiers for the device using the method described in FIG. 3. Different device identifiers may be generated for functions that can appear across different transports.

Function identifiers may be used to merge objects generated for functions of a multi-function, multi-transport device. Generated multi-function objects may have the same function identifiers across different transports. The multi-function objects may have one or more different device identifiers, as described in more detail below. A single object may then be created to represent the multi-function, multi-transport device. Therefore, the same device identifier 630 may be provided by device 600 both when it is a multi-function device on a single transport (e.g., a cell phone connected to a computer via a USB connection) or a multi-function multi-transport device (e.g., a cell phone connected to a computer via a USB and Bluetooth connection).

Referring back to FIG. 4, it should be appreciated that the illustrated components are shown by way of example only and other suitable components and their combination may be used to implement embodiments of the invention.

Figure 5:
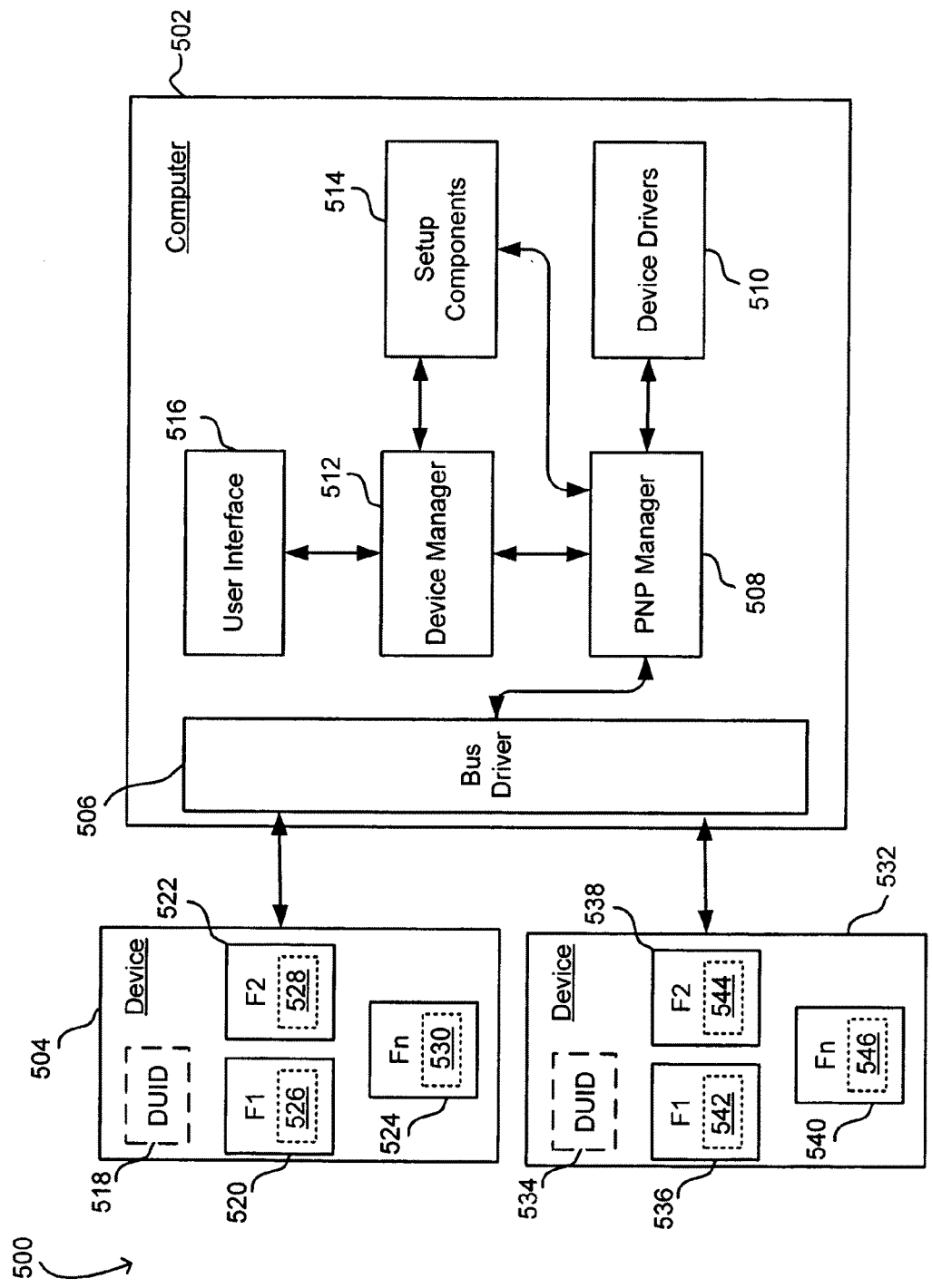
FIG. 5 is a block diagram of a system comprising multiple multi-function devices in which some embodiments of the invention may be implemented.

A computer may be connected to multiple multi-function devices. A system 500 shown in FIG. 5 illustrates an example where two multi-function devices are associated with a computer. A computer 502 and devices 504 and 532 of system 500 include components identical to the components shown in FIG. 4. It should be appreciated that devices 504 and 532 may be multi-function, multi-transport devices. Further, the devices may perform different numbers of functions, and three functions for each device are shown by way of example only. Devices 504 and 532 have different identifiers 518 and 534, respectively, provided with the devices or generated for them, for example, by PNP manager 508.

Figure 7:
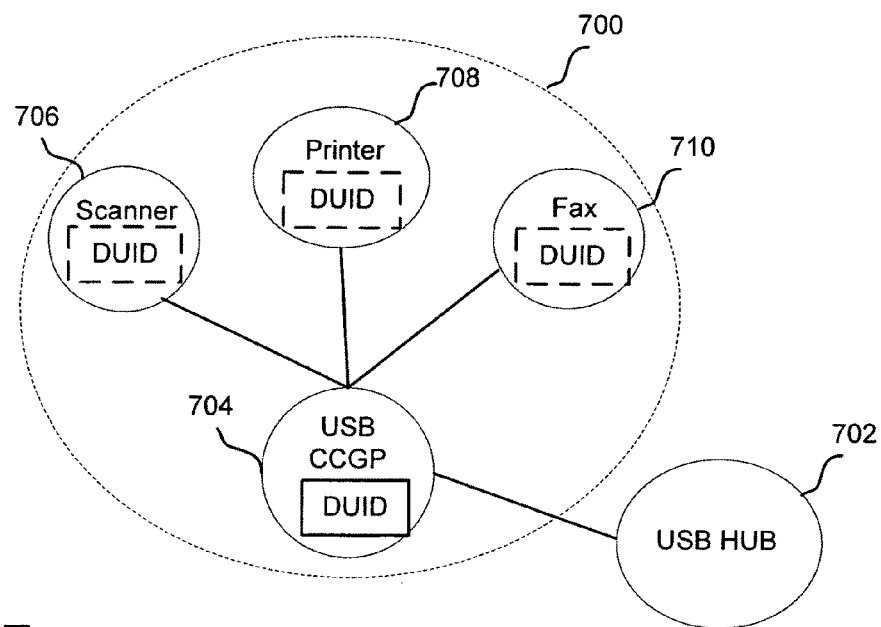
FIGS. 7-9 are sketches of examples of interconnections of functions in multi-function devices.

Multi-function devices may have different topologies and may be associated with a computer via multiple communication media. FIG. 7 shows an example of a multi-function device 700 which performs functions of a printer 708, scanner 706 and fax 710. In the embodiment illustrated in FIG. 7, each of the functions may initially not include a device identifier. However, each of the functions 706, 708 and 710 is connected through a bus hierarchy that allows the same identifier to be associated with each of the functions 706, 708 and 710.

In the example illustrated, device 700 is associated with a computer via a USB connection shown as a USB hub 702. Devnodes for printer 708, scanner 706 and fax 710 functions have a parent devnode, a USB CCGP driver. USB CCGP driver has a device identifier denoted as DUID. In an hierarchy, USB CCGP 704 will appear above each of the functions 706, 708 and 710. Accordingly, each of the devices 706, 708 and 710 may inherit from USB CCGP the identifier DUID. As a result, each of the functions 706, 708 and 710 may be assigned the same value for a device identifier and may be identified as belonging to the same multi-function device. In embodiments where device 700 is a multi-function, multi-transport device, functions 706, 708 and 710 may have different FUIDs which are used to match identical function instances across multiple transports.

Figure 8:
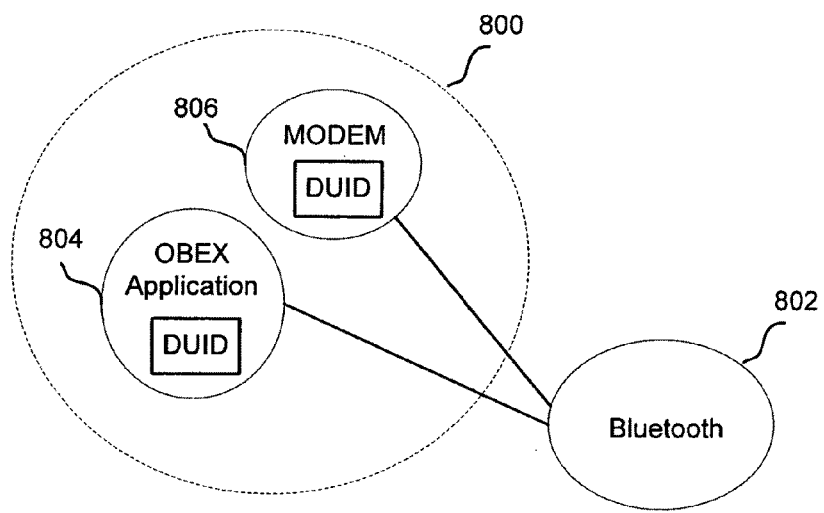

FIG. 8 shows another example of a multi-function device 802 that comprises an Object Exchange (OBEX) protocol application 804 and a modem function 806 which both have the same identifier (DUID). Device 800 is connected to a computer via a Bluetooth connection 802. In this example, functions 804 and 806 do not have a parent devnode. However, in the embodiment illustrated, functions 804 and 806 each share the same identifier and may therefore also be identified as functions of the same multi-function device.

Figure 9:
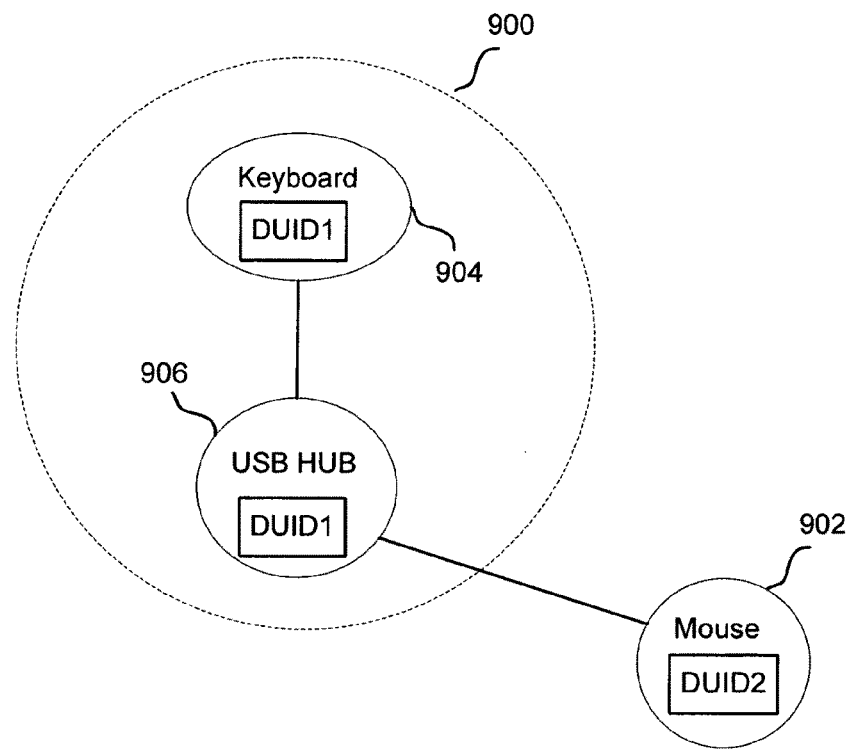

Multi-function devices may have children devices which are not physically part of the devices. FIG. 9 demonstrates an example of a compound multi-function device 900 with a keyboard 904 and a USB hub 906 functions. Device 900 has a mouse 902 plugged in into the device. In the example of FIG. 9, keyboard 904 interfaces to a computer through USB hub 906. Both keyboard 904 and USB hub 906 have the same device identifier denoted as DUID1. Mouse 902 belongs to a separate device and therefore has a different device identifier shown by way of example as DUID2.

As discussed above, a multi-function device may be connected to a computer via multiple transports and, in some embodiments, instances of the same device, whether created by access to different functions of the device or created by access to the same functions across different transports, may be synthesized into a multi-function object that may be used by a computer. A computer may use a multi-function object to perform known functions currently performed on single function objects. For example, FIG. 1 illustrates a display generated to provide information about devices connected to computer system 100. Such a display may be generated using objects created for each of the functions connected to the computer system. The display illustrated in FIG. 2, according to embodiments of the invention, may be generated using multi-function objects associated with multi-function devices. However, multi-function objects may be used in any suitable way.

Figure 10:
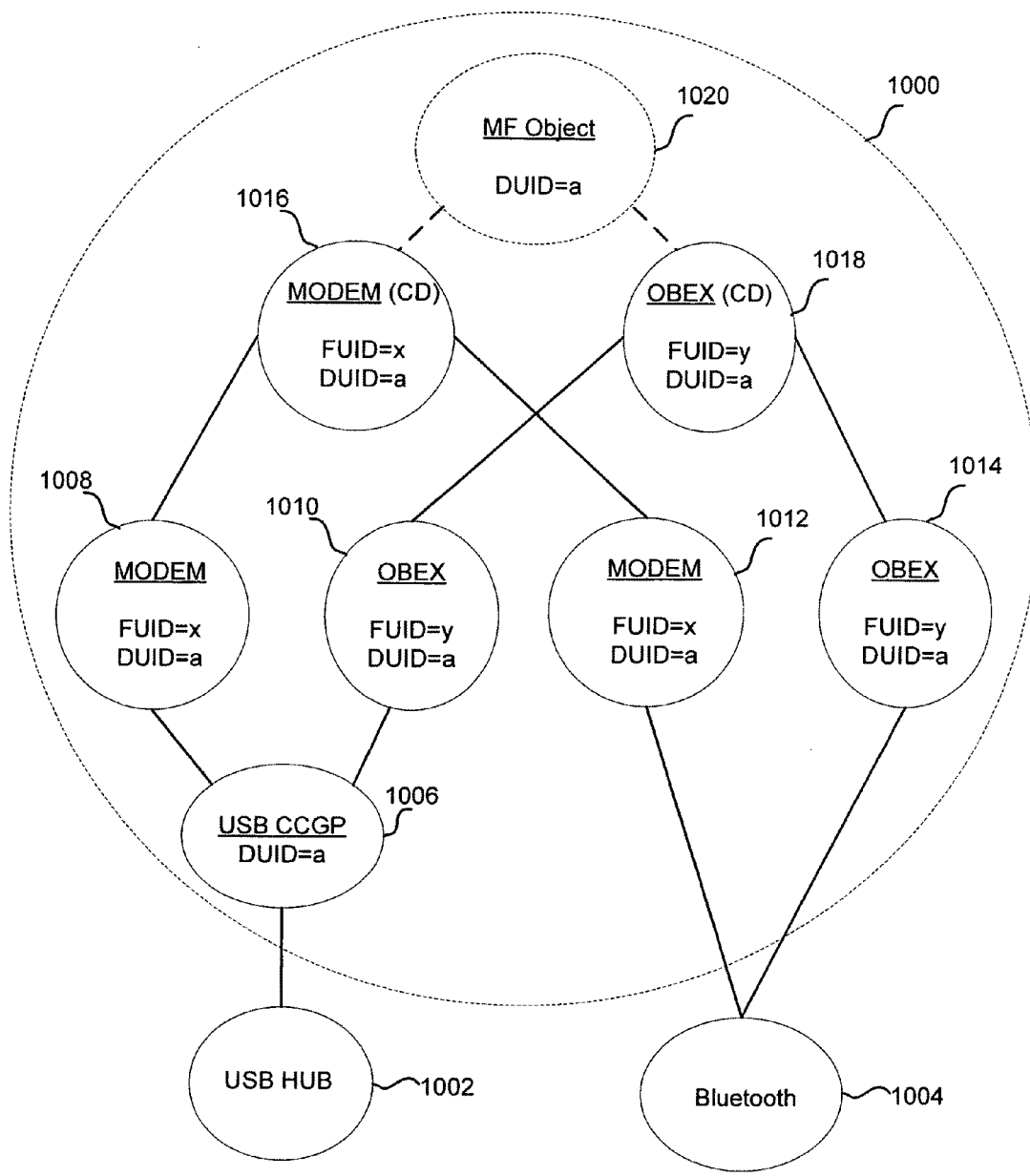
FIGS. 10-11 are sketches of objects generated for multi-function, multi-transport devices according to some embodiments of the invention.

Multi-function objects may be created based on function and device identifiers obtained or generated for functions connected to a computer system. FIG. 10 illustrates an example of how identified functions may be grouped based on the identifiers to associate functions of a single device, regardless of the transport over which those functions are accessed, with a single multi-function object 1020.

FIG. 10 comprises an example of a multi-function, multi-transport device 1000 (e.g., a cell phone) that has an OBEX protocol application function and a modem function. Device 1000 is connected to a computer via a USB hub 1002 and a Bluetooth connection 1004. In this example, USB hub 1002 may be marked as removable because it is a single physical device. An identifier, shown by way of example as "DUID=a," for device 1000 is available (e.g., provided by a manufacturer of the multi-function, multi-transport device, generated by a driver such as a bus driver and associated with a MAC address, a serial number of the device or with other suitable parameters) and is the same for each function. In some embodiments of the invention, this identifier is provided via a bus driver.

For each of the functions, a function identifier is provided. On the USB connection, the functions have a parent devnode, a USB CCGP driver 1006. The function identifier for the OBEX application function is denoted by way of example only as a function identifier "y" (FUID="y") and the function identifier for the modem function is denoted by way of example only as a function identifier "x" (FUID="x"). The OBEX application and modem functions may be marked as non-removable. The function identifiers for the OBEX application and modem functions that can appear over the USB connection may be provided by the parent node, USB CCGP driver 1006. The OBEX application and the modem functions may provide, or "declare," the function identifiers. It should be appreciated that the function identifiers may be provided using any suitable method. In the example illustrated, objects 1008 and 1010 may be built for the functions connected via the USB connection. It should be noted that the device identifier may be inherited by the OBEX application function object 1010 and the modem function object 1108 from their parent node USB CCGP driver 1006.

On the Bluetooth connection, the same function identifiers, "x" and "y" may be provided for the modem and OBEX application functions, respectively. The OBEX application and the modem functions may provide, or "declare," the function identifiers. The function identifiers may also be provided by Bluetooth 1004, which means that a devnode associated with a Bluetooth controller or other suitable component provides the identifiers via a bus driver. Any suitable method may be substituted. Respective objects 1012 and 1014 may be built for the modem and OBEX application functions connected via the Bluetooth connection. The device identifier for objects 1012 and 1014 may be generated, for example, by a driver such as a bus driver and associated with a MAC address.

A multi-function composite device (CD) object 1016 with a function identifier "x" may be built based on object 1008. Similarly, a multi-function composite device (CD) object 1018 with a function identifier "y" may be built based on object 1010. It should be appreciated that objects 1012 and 1014 may be created after objects 1016 and 1018 are created. Further, based on matching function identifiers (FUID="x"), object 1012 may be linked with object 1016. Object 1014 may be linked with object 1018 based on matching function identifiers (FUID="y"). Composite device objects 1016 and 1018 may then be merged, or linked together, to generate a single multi-function object 1020 for device 1000. In the example illustrated, because composite device objects 1016 and 1018 have the same single device identifier, the multi-function object 1020 has the same device identifier ("DUID=a"). A device identifier associated with object 1020 may then be used to identify device 1000 as a single multi-function, multi-transport device.

Figure 11:
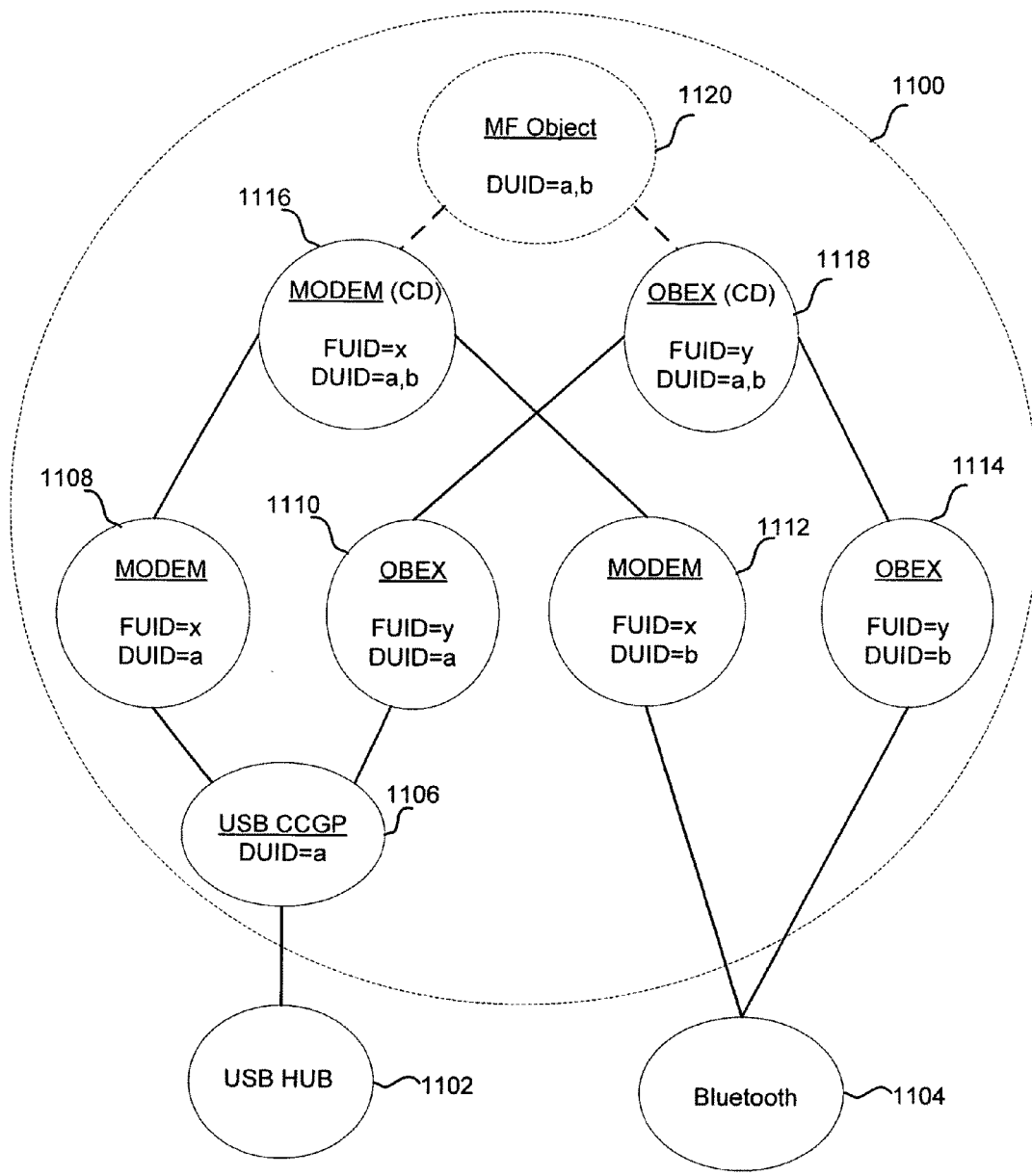

As discussed above, in other embodiments, the device identifier may not be available for a multi-function, multi-transport device and may need to be generated using methods provided by embodiments of the invention. For example, a method illustrated in FIG. 3 may be used. FIG. 11 illustrates an example of generating a device identifier for such multi-function, multi-transport device 1100 (e.g., a cell phone).

Similarly to device 1000 shown in FIG. 10, device 1100 comprises modem and OBEX application functions. Components shown in FIG. 11 are similar to those represented in FIG. 10 and function identifiers may be provided as described above in conjunction with FIG. 10. Device 1100 is connected to a computer via a USB hub 1102 and a Bluetooth connection 1104. The function identifier for the OBEX application function is denoted by way of example only as a function identifier "y" (FUID="y") and the function identifier for the modem function is denoted by way of example only as a function identifier "x" (FUID="x"). In the example illustrated, different device identifiers may be generated for the modem and OBEX application functions that support different types of connection. Thus, functions that support a USB connection have a device identifier "a" ("DUID=a") and functions that support a Bluetooth connection have a device identifier "b" ("DUID=b"). Therefore, objects 1108 and 1100 are associated with a device identifier "a" ("DUID=a") and objects 1128 and 1114 are associated with a device identifier "b" ("DUID=b").

A multi-function composite device (CD) object 1116 with a function identifier "x" may be built based on object 1108. Similarly, a multi-function composite device (CD) object 1118 with a function identifier "y" may be built based on object 1110. It should be appreciated that objects 1112 and 1114 may be created after objects 1116 and 1118 are created. Further, based on matching function identifiers (FUID="x"), object 1112 may be linked with object 1116. Object 1114 may be linked with object 1118 based on matching function identifiers (FUID="y"). Since two different device identifiers has been generated, composite device objects 1116 and 1118 are associated with both device identifiers "a" ("DUID=a") and "b" ("DUID=b"). Composite device objects 1116 and 1118 may be merged, or linked together, to generate a single multi-function object 1120 for device 1100 using any suitable method. In the example illustrated, because composite device objects 1116 and 1118 are associated with two device identifiers, the multi-function object 1120 has both device identifiers "a" ("DUID=a") and "b" ("DUID=b"). A device identifier comprising the two device identifiers "a" ("DUID=a") and "b" ("DUID=b") may then be used to identify device 1100 as a single multi-function, multi-transport device. The two device identifiers may be merged to obtain a single device identifier to identify the multi-function, multi-transport device.

In FIGS. 10 and 11, the same functions are shown provided by a multi-function device across each transport. It should be appreciated that different number of different functions may be provided across different transports. Further, while some functions may be provided across multiple transports, some functions may be provided via a single type of connection.

Figure 12:
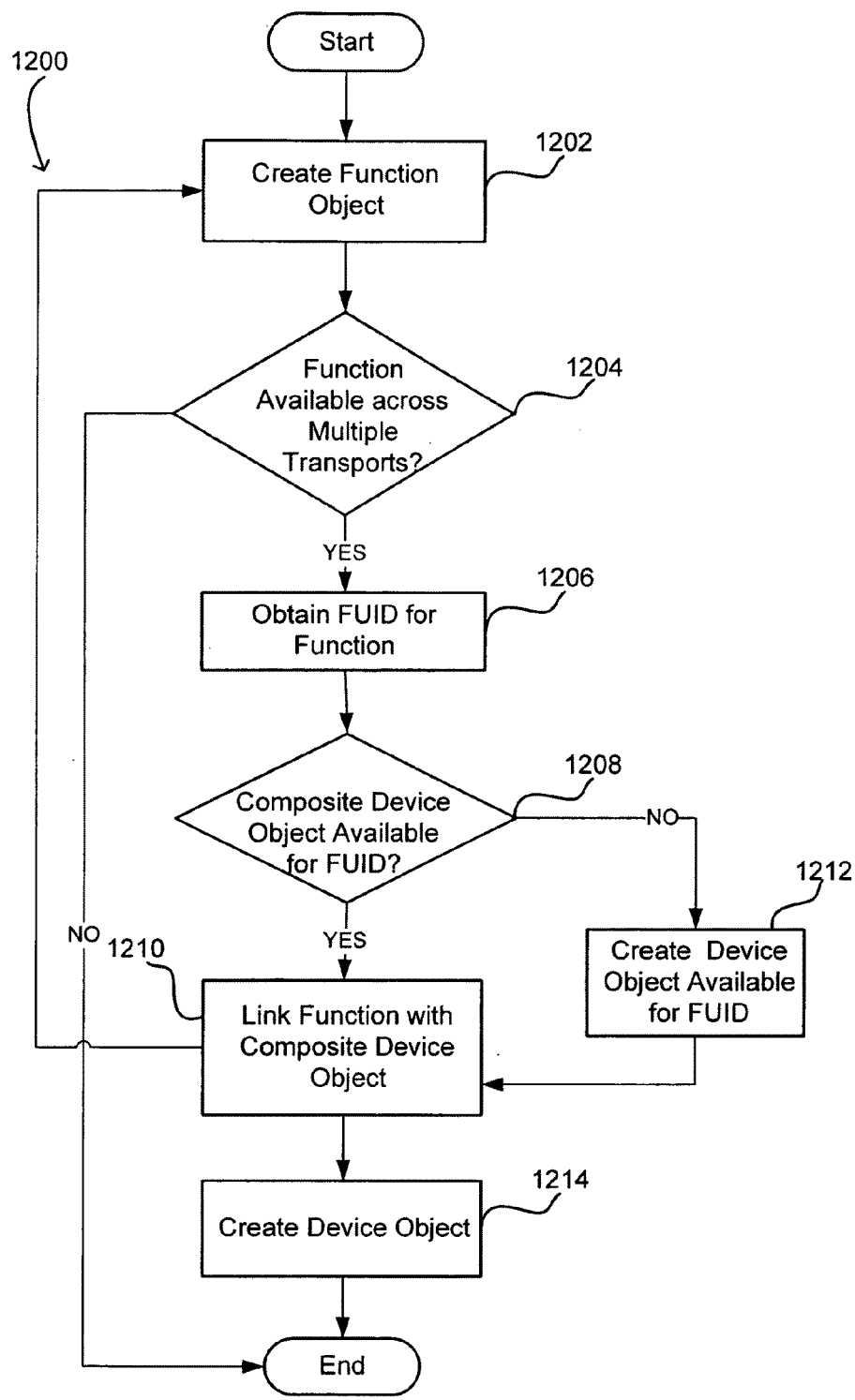
FIG. 12 is a flowchart of a method of generating an identifier for a multi-function, multi-transport device according to an embodiment of the invention.

FIG. 12 is a flowchart of a method 1200 of generating a device identifier for a multi-function, multi-transport device according to embodiments of the invention. The device may be, for example, a cell phone discussed in connection with FIGS. 10 and 11 or any other suitable device.

As discussed above, the process may start when a device is plugged in or is otherwise associated with a computer. It may also start upon starting up the computer or at any other suitable time. Device identifiers for the multi-function, multi-transport device may be provided with the device or generated as described above with reference to FIG. 3. When a function of a device is discovered, an object for a function may be created, in block 1202. Further, it may be determined in a decision block 1204 whether the function may support multiple transports. Device drivers loaded for the functions may include information on whether the function may support multiple transports (e.g., may appear via different types of connection). If it is determined that function may support multiple transports, the process may branch to step 1206 where a function identifier for the function is obtained as described above. Otherwise, the process may end. It should be appreciated that the described process is shown as having an end by way of example only since it may be continuous because devices and/or functions may be discovered at any time.

Further, it may be determined in decision block 1208 whether a composite device object with the function identifier assigned to the function already exists. As an illustration, it may be determined, for object 1112 with a function identifier "x," that composite device object 1116 with the function identifier "x" has been created. If it is determined that such composite device object does not exist, the process may branch to block 1212 where the composite device object is created. Referring again to FIG. 11, when object 1108 with the function identifier "x" is created for the modem function that supports a USB connection, composite device with this function identifier may not exist and object 1116 may then be created. The function object may then be linked to the generated or existing composite device object, based on matching function identifiers, in block 1210.

It should be appreciated that process shown in FIG. 12 is described using illustration from FIG. 11 by way of example only and other different objects may be generated and linked together based on matching function identifiers. Moreover, block 1210 may comprise multiple steps of linking objects together. As shown schematically in FIG. 12, the process may return to block 1202 to create objects for other functions. It should be appreciated that the process may be continuous since devices and/or functions of a multi-function, multi-transport may be discovered at any point.

The composite device objects may be merged in block 1214 using any suitable method to create device identifiers (e.g., objects 1020 and 1120) used to represent the multi-function, multi-transport device as a single entity. If the objects being merged have different device identifiers, as shown in FIG. 11, the device identifiers may be merged to obtain a single device identifier to identify the multi-function, multi-transport device.

The device identifiers may be optionally stored.

Figure 13:
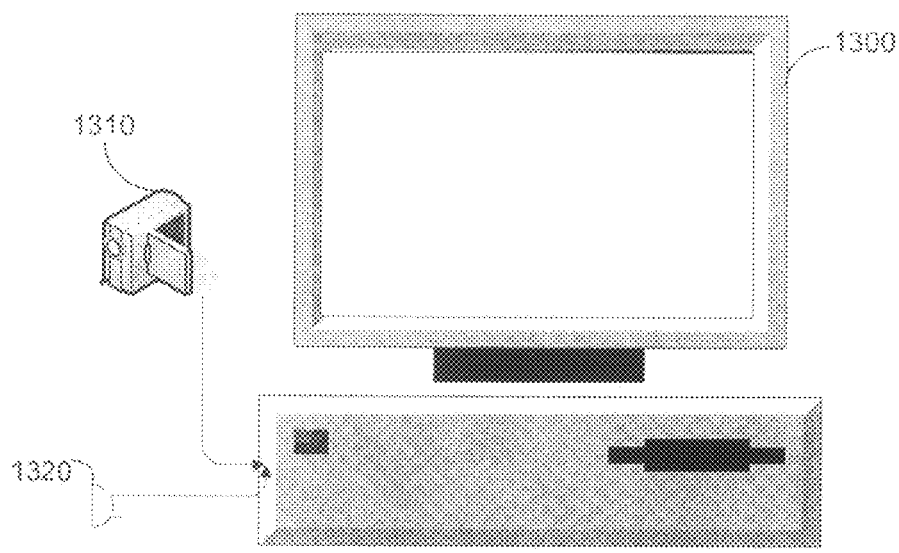
FIG. 13 is a sketch of a computer system according to an embodiment of the invention.

Regardless of how multi-function objects are created, the multi-function objects provide a mechanism for a computer to manipulate the functions associated with a single device as a device. Accordingly, any suitable mechanism may be used within a computer system to store information indicating either that a device is a multi-function device or that specific functions are associated with a single device. This information may be used in multiple ways within a computer system. For example, FIG. 2 illustrates that the information may be used to present to a user a display in an intuitive fashion, with multi-function devices represented with icons that match the physical appearance of the devices. FIG. 13 illustrates an alternative way in which information about multi-function devices may be used. In the example of FIG. 13, computer 1300 has connected to it an audio/video device 1310 and a microphone 1320. The audio/video device 1310 may be a multi-function device, containing both a camera and a microphone. The camera and the microphone within multi-function device 1310 may be represented as separate functions within computer system 1300. However, embodiments of the invention in which multi-function devices are identified and functions are represented in a way that allows functions in the same device to be identified, the camera and microphone functions within multi-function device 1310 may be associated with each other. Accordingly, when a user interacts with computer 1300 to manage devices to record an audio/video clip, the user may readily identify that a microphone within multi-function device 1310 is associated with the camera in multi-function device 1310. In this way, the user may select an appropriate microphone to use for recording sound in conjunction with video information captured by multi-function device 1310. This selection may be made more easily than in prior art systems in which each function would be displayed separately. In such a prior art system, the microphone function within audio/video device 1310 may be displayed in a fashion that is indistinguishable from microphone 1320.

Information associating functions with each other based on the location within the same device may be used in ways other than to present displays to a user. For example, an application capturing audio/video information may use the same information to automatically select a camera and a microphone based on their association within multi-function device 1310. Accordingly, once information on multi-function devices is obtained, it may be used in any suitable way according to embodiments of the invention.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. In a computer system comprising a computer and a device operable to perform at least one function, a method comprising:

obtaining an identifier for the device, the device comprising a peripheral connected via a bus or local wireless connection with the computer, the device comprising component peripherals, wherein the device and the component peripherals are each addressable by the computer via the bus or wireless connection as individual devices;

identifying, based on the identifier, that the device is a single physical multi-function device performing a plurality of functions corresponding to the peripheral components, respectively, wherein each function of the plurality of functions is identified by a same identifier; and using the identifier to select information relating to the single physical multi-function device to display, in a graphical user interface that is used to manage devices of the computer system, an icon representing the multi-function device, wherein the graphical user interface displays icons to represent both single-function devices and multi-function devices, wherein the graphical user interface responds to user input directed to the icon of the multi-function device by displaying representations of each of the peripheral components, wherein the icon of the multi-function device can be interacted with by a user to perform management tasks on the device that automatically trigger corresponding management tasks being performed for the peripheral components.

2. The method of claim 1, wherein the identifier comprises a unique device identifier.

3. The method of claim 1, wherein obtaining the identifier comprises, when the identifier from the device is not available, determining whether the function is removable from the device.

4. The method of claim 3, wherein obtaining the identifier further comprises, when it is determined that the function is removable, generating the identifier.

5. The method of claim 3, wherein, when it is determined that the function is not removable, the identifier comprises an identifier associated with a node that is a parent node of the function in a hierarchy of nodes associated via a bus communication.

6. The method of claim 5, wherein obtaining the identifier further comprises, when it is determined that the function is not removable and the hierarchy of nodes associated via a bus communication is not available, generating the identifier.

7. The method of claim 2, wherein the device is associated with the computer via a plurality of communication media, and wherein obtaining the identifier comprises obtaining the identifier from a first function driver of the device associated with a first communication medium and obtaining the identifier from a second function driver of the device associated with a second communication medium.

8. The method of claim 7, further comprising generating a plurality of composite device objects for the plurality of function, wherein each composite device object represents a function from the plurality of functions.

9. The method of claim 8, further comprising merging the plurality of composite device objects to generate a single object representing the device.

10. The method of claim 1, wherein obtaining the identifier for the device comprises receiving the identifier via a bus driver, the bus driver providing the identifier in connection with each of the plurality of functions.

11. The method of claim 2, wherein obtaining the identifier for the device comprises obtaining the identifier from a nonvolatile computer-readable media of the device.

12. The method of claim 1, further comprising displaying the selected information relating to the device as a single entity.

13. The method of claim 1, wherein the single entity comprises an icon corresponding to the device.

14. The method of claim 1, wherein using the identifier to display to the user information relating to the device comprises visually identifying the plurality of functions as being performed by the device.

15. A method of operating a computer system comprising a computer and a device operable to perform a plurality of functions, the method comprising:

obtaining a first identifier for a device performing a first function of the plurality of functions;

obtaining a second identifier for a device performing a second function of the plurality of functions;

in response to a selection of the first function, using the second function in conjunction with the first function based on the second identifier identifying a single multi-function device as the first identifier, wherein the computer system has a bus or wireless interface, wherein the multi-function device and the first and second functions thereof are addressable via the bus or wireless interface; and displaying, in a graphical user interface that is used to manage devices of the computer system, an icon representing the multi-function device, wherein the graphical user interface displays icons to represent both single-function devices and multi-function devices, wherein the graphical user interface responds to user input directed to the icon of the multi-function device by displaying representations of each of the peripheral components, wherein the icon of the multi-function device can be interacted with by a user to perform management tasks on the multi-function device and can interact with the representations to perform management tasks on the first and second functions.

16. The method of claim 15, wherein using the second function in conjunction with the first function comprises performing at least one function selected from the group consisting of installing, uninstalling, updating, rolling back and repairing software associated with the first or second functions.

17. The method of claim 15, wherein the first function comprises a camera, and using the second function comprises receiving sound through a microphone in the same device as the camera.

18. A computer-readable storage medium encoded with computer-executable instructions for performing a method in a computer system comprising a computer and a device operable to perform a plurality of functions, wherein the computer-readable storage medium is not a signal, the computer-executable instructions, when executed by at least one processor, performing a method comprising:

obtaining an identifier for the device;

identifying, based on the identifier, that the device is a single multi-function device performing a plurality of functions, wherein the multi-function device and the functions thereof connect with the computer system via a bus thereof and are independently addressable via the bus; and displaying, in a graphical user interface that is used to manage devices of the computer system, an icon representing the multi-function device, wherein the graphical user interface displays icons to represent both single-function devices and multi-function devices, wherein the graphical user interface responds to user input directed to the icon of the multi-function device by displaying representations of each of the functions, wherein the icon of the multi-function device can be interacted with by a user to perform management tasks on the multi-function device and the representations can be interacted with to perform management tasks on the functions.

19. The computer-readable storage medium of claim 18, wherein obtaining the identifier for each function from the plurality of functions comprises receiving the identifier via an entity capable of discovering the device.

20. The computer-readable storage medium of claim 19, wherein the entity capable of discovering the device comprises a bus driver.

* * * * *